(12) United States Patent
Rusin et al.

(10) Patent No.: US 10,553,018 B2
(45) Date of Patent: Feb. 4, 2020

(54) SYSTEM AND METHOD FOR PARALLEL ASSEMBLE OF PRIMITIVES

(71) Applicant: VMware, Inc., Palo Alto, CA (US)

(72) Inventors: Zack Rusin, Rose Valley, PA (US); Jose Manuel Rios Fonseca, London (GB)

(73) Assignee: VMware, Inc., Palo Alto, CA (US)

( * ) Notice: Subject to any disclaimer, the term of this patent is extended or adjusted under 35 U.S.C. 154(b) by 9 days.

(21) Appl. No.: 15/878,070

(22) Filed: Jan. 23, 2018

(65) Prior Publication Data

US 2019/0228566 A1 Jul. 25, 2019

(51) Int. Cl.
*G06T 15/80* (2011.01)
*G06T 15/40* (2011.01)

(52) U.S. Cl.
CPC ............ *G06T 15/405* (2013.01); *G06T 15/80* (2013.01)

(58) Field of Classification Search
None
See application file for complete search history.

(56) References Cited

U.S. PATENT DOCUMENTS

| | | | |
|---|---|---|---|
| 2017/0178401 A1* | 6/2017 | Agrawal | G06T 17/10 |
| 2017/0262954 A1* | 9/2017 | Arntzen | G06T 15/005 |
| 2018/0137676 A1* | 5/2018 | Arrabi | G06T 1/20 |

OTHER PUBLICATIONS

Patent Application:—U.S. Appl. No. 15/610,192, filed May 31, 2017, entitled "Emulation of Geometry Shaders and Stream Output Using Compute Shaders".

* cited by examiner

*Primary Examiner* — Andrew G Yang
(74) *Attorney, Agent, or Firm* — Patterson + Sheridan, LLP (57) ABSTRACT

A system and method for parallel computation and assembly of primitives comprises identifying cut indices within an index buffer, identifying positions of cut indices, determining validity of primitives, and invoking a geometry shader of a graphics pipeline. The validity of two or more primitives is determined in parallel and geometry shader is invoked with the index buffer, the cut indices, and the valid primitives.

20 Claims, 6 Drawing Sheets

SYSTEM AND METHOD FOR PARALLEL ASSEMBLE OF PRIMITIVES

BACKGROUND

Modern graphics processing units (GPUs) implement a programmable hardware pipeline, referred to herein as a "graphics pipeline" or a "GPU pipeline," for rendering real-time 3D graphics. Applications invoke high-level graphics application programming interfaces (APIs), such as Direct3D and OpenGL, to configure this pipeline and to provide shaders, which are programs for performing application-specific graphics or compute operations (e.g., per-vertex processing, per-pixel processing, etc.). Drivers implementing the graphics APIs translate the application-provided API calls and shaders into instructions that are executed by GPU hardware.

In a 3D graphics pipeline, the geometry to be rendered is provided in the form of vertex coordinates. These vertices are assembled into primitives (e.g., points, lines or triangles). However, due to changes in the graphics pipeline, assembling the primitive is an extremely difficult and time intensive task. The changes to the graphics pipeline include the introduction of strips, new primitives (e.g., adjacency primitives), and index buffers with cut-indices, and removal of some primitives (e.g., triangle fans). Further complicating the assembly of primitives, the changes to the pipeline where made in addition to the requirement to correctly preserve winding information between the encoded primitives.

Strips are a method of encoding geometries using less vertex data, reducing memory requirements. For example, 6 vertices in a triangle-strip encode 4 triangles, as compared to a triangle list which would need 12 vertices to create 4 triangles. However, the strips need to be coded before the primitives can be assembled, increasing the complexity of assembling the primitives. The concept of winding corresponds to the ordering of the vertices (e.g., counter or clockwise) and is used to determine whether a primitive is front or back facing. In strips, the winding order is flipped in order to preserve the correct front/back order of primitives, and must be determined when assembling the primitives, adding further complexity.

Removing triangle fans created the requirement to have the corresponding primitives decomposed before entering the graphics API. Further, adjacency primitives, which extend lines and triangles with data of vertices adjacent to them but not part of them, have to be decomposed into regular points, lies, or triangles for rendering.

Further, to allow content creators to use multiple strips in a single draw operation, the concept of a "cut" or "restart" index was introduced. However, this increased the complexity of assembling primitives, introducing additional steps to be completed. For example, when rendering geometry, the index buffer is used. The index buffer is a buffer containing indices into the vertex buffer, allowing vertex data to be reused for multiple vertices. Cut (restart) indices are indices whose value is equal to the maximum representable value for the current buffer. For example, for a buffer of 16 or 32 bit integers, the value may be 0xffff or 0xffffffff. Further, a cut index may be represented by a −1. Cut indices indicate an end of a strip, and that subsequent indices specify a new strip.

The difficulty of decomposition is further increased as vertex data is fundamentally linear. Thus, it is not possible to look at a specific vertex and determine which, if any, triangle the vertex is a part of without also knowing if the index buffer includes cut indices before the vertex.

In view of the complexity of various aspects of the graphics pipeline, various graphics hardware and API approaches removed support for the more complex aspects of the graphics pipeline. However, virtualized graphics APIs are required to support all aspects of the graphics pipeline. The ability to correctly virtualize graphics APIs on top of other APIs hinges on the ability of the virtualized graphics API to be able to efficiently perform primitive (or index) assembly. Thus, there is a need to increase the efficiency of primitive assembly.

SUMMARY

In one embodiment, a method for parallel assembly of primitives within a graphics pipeline comprises identifying cut indices within the index buffer, identifying positions of cut indices, determining validity of each of a plurality of primitives based on the index buffer, the cut indices, and the positions of cut indices, and invoking a geometry shader of graphics pipeline with the index buffer, the cut indices, and valid primitives to render one or more 3D graphics. The validity of at least two primitives of the plurality of primitives are determined in parallel.

In another embodiment, a computer system comprises a graphics processing unit comprising instructions to identify cut indices within an index buffer, identify positions of cut indices, determine validity of each of a plurality of primitives based on the index buffer, the cut indices, and the positions of cut indices, and invoke a geometry shader of graphics pipeline with the index buffer, the cut indices, and valid primitives to render one or more 3D graphics. The validity of at least two primitives of the plurality of primitives is determined in parallel.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
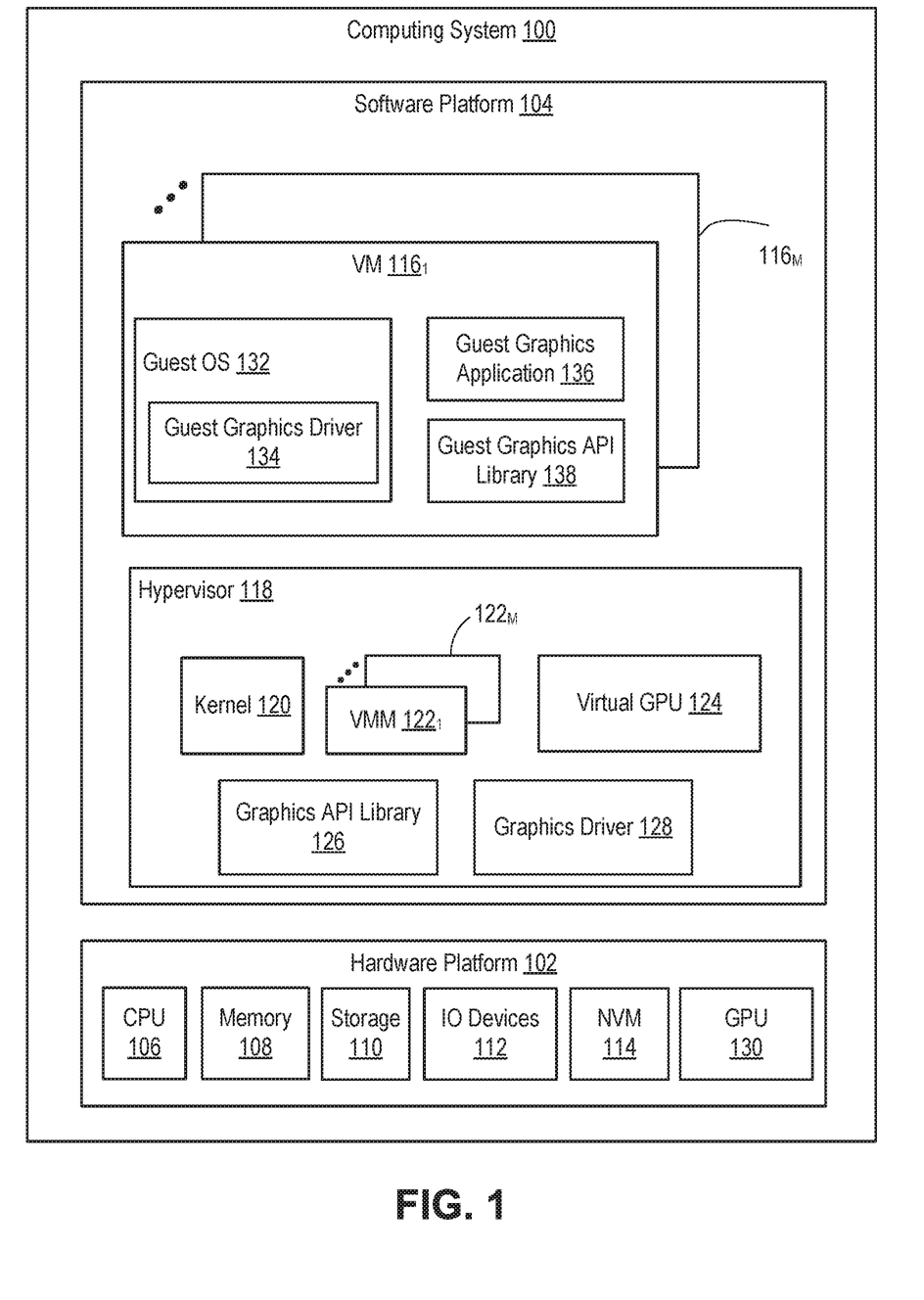
FIG. 1 is a block diagram depicting a computing system according to another embodiment.

FIG. 1 is a block diagram depicting a computing system 100 according to an embodiment. Computing system 100 includes a software platform 104 executing on a hardware platform 102. Hardware platform 102 may include conventional components of a computing device, such as a central processing unit (CPU) 106, system memory ("memory" 108), storage 110, input/output (10) devices 112, a nonvolatile memory (NVM) 114 and graphics processing unit (GPU) 130. CPU 106 is configured to execute instructions, for example, executable instructions that perform one or more operations described herein and may be stored in memory 108 and storage 110. Memory 108 is a device allowing information, such as executable instructions, virtual disks, configurations, and other data, to be stored and retrieved. Memory 108 may include, for example, one or more random access memory (RAM) modules. Storage 110 includes local storage devices (e.g., one or more hard disks, flash memory modules, solid state disks, and optical disks) and/or a storage interface that enables computing system 100 to communicate with one or more network data storage systems. Examples of a storage interface are a host bus adapter (HBA) that couples computing system 100 to one or more storage arrays, such as a storage area network (SAN) or a network-attached storage (NAS), as well as other network data storage systems. IO devices 112 include conventional interfaces known in the art, such as one or more network interfaces, serial interfaces, universal serial bus (USB) interfaces, and the like. NVM 114 is a device allowing information to be stored persistently regardless of the state of power applied to computing system 100 (e.g., FLASH memory or the like). NVM 114 may store firmware for computing system 100, such as a Basic Input/Output System (BIOS), Unified Extensible Firmware Interface (UEFI), or the like. GPU 130 is configured to execute instructions to update a display, for example, executable instructions that perform one or more operations described herein to update a display of a display device of IO devices 112 and may be stored in memory 108 and storage 110. In one example, GPU 130 receives instructions from CPU 106 to update the display of a display device.

Software platform 104 includes a virtualization layer that abstracts processor, memory, storage, and networking resources of hardware platform 102 into one or more virtual machines ("VMs") $116_1 \ldots 116_M$ (collectively VMs 116) that run concurrently on computing system 100. VMs 116 run on top of the virtualization layer, referred to herein as a hypervisor 118, which enables sharing of the hardware resources by VMs 116. One example of hypervisor 118 that may be used in an embodiment described herein is a VMware ESXi™ hypervisor provided as part of the VMware vSphere® solution made commercially available from VMware, Inc. of Palo Alto, Calif. (although it should be recognized that any other virtualization technologies, including Xen® and Microsoft Hyper-V® virtualization technologies may be utilized consistent with the teachings herein). Hypervisor 118 is known as a Type-1 or "bare-metal" virtualization software.

Each VM 116 supported by hypervisor 118 includes guest software that runs on the virtualized resources supported by hardware platform 102. In the example shown, the guest software of each VM 116 includes a guest OS 132. Guest OS 132 can be any commodity operating system known in the art, such as such as Linux®, Microsoft Windows®, Mac OS®, or the like. In various embodiments, each VM 116 includes a guest graphics application 136 and a guest graphics API library 138. Guest graphics application 136 is configured to generate 3D graphics for presentation to a user of computing system 100 via GPU 130.

For example, guest graphics application 136 interacts with guest graphics API library 138 to control the graphics pipeline of GPU 130. In one embodiment, guest graphics API library 138 exposes a set of high-level functions that guest graphics application 136 can invoke to control the graphics pipeline of GPU 130.

In one embodiment, guest graphics API library 138 communicates with guest graphics driver 134. Guest graphics driver 134 translates the API calls into corresponding instructions (i.e., GPU opcodes) that can be understood and executed by GPU 130. Guest graphics driver 134 is configured to act as a bridge between the high-level functions exposed by graphics guest graphics API library 138 and the machine level code needed to execute those functions on the specific hardware architecture of GPU 130.

Hypervisor 118 includes, among other components, a kernel 120 and virtual machine monitors (VMMs) $122_1 \ldots 122_M$ (collectively VMMs 122). In an embodiment, Hypervisor 118 further comprises Virtual GPU 124, Graphics API Library 126 and Graphics Driver 128.

Kernel 120 provides operating system functionality (e.g., process creation and control, file system, process threads, etc.), as well as CPU scheduling and memory scheduling. VMMs 122 are processes scheduled by kernel 120 to implement the virtual system support for VMs 116. Each VMM 110 manages a corresponding virtual hardware platform. The virtual hardware platform includes virtual CPUs (vCPUs), guest physical memory, virtual IO devices, and the like.

Virtual GPU 124 is configured to accept, from guest graphics driver 134, graphics API calls issued by guest graphics application 136 that are exposed by guest graphics API library 138. Virtual GPU 124 is further configured to translate the API calls into corresponding API calls for a graphics API library 126. The Graphics API library 126 is implemented by graphics driver 128 on hypervisor 118. In one example, guest graphics API library 138 is a Direct3D and graphics API library 126 is metal. In such an example, virtual GPU 124 translates the Direct3D API calls issued by guest graphics application 136 into corresponding Metal API calls. Graphics driver 128 converts the translated API calls provided by virtual GPU 124 into GPU opcodes that can be executed on hardware on GPU 130.

Figure 2:
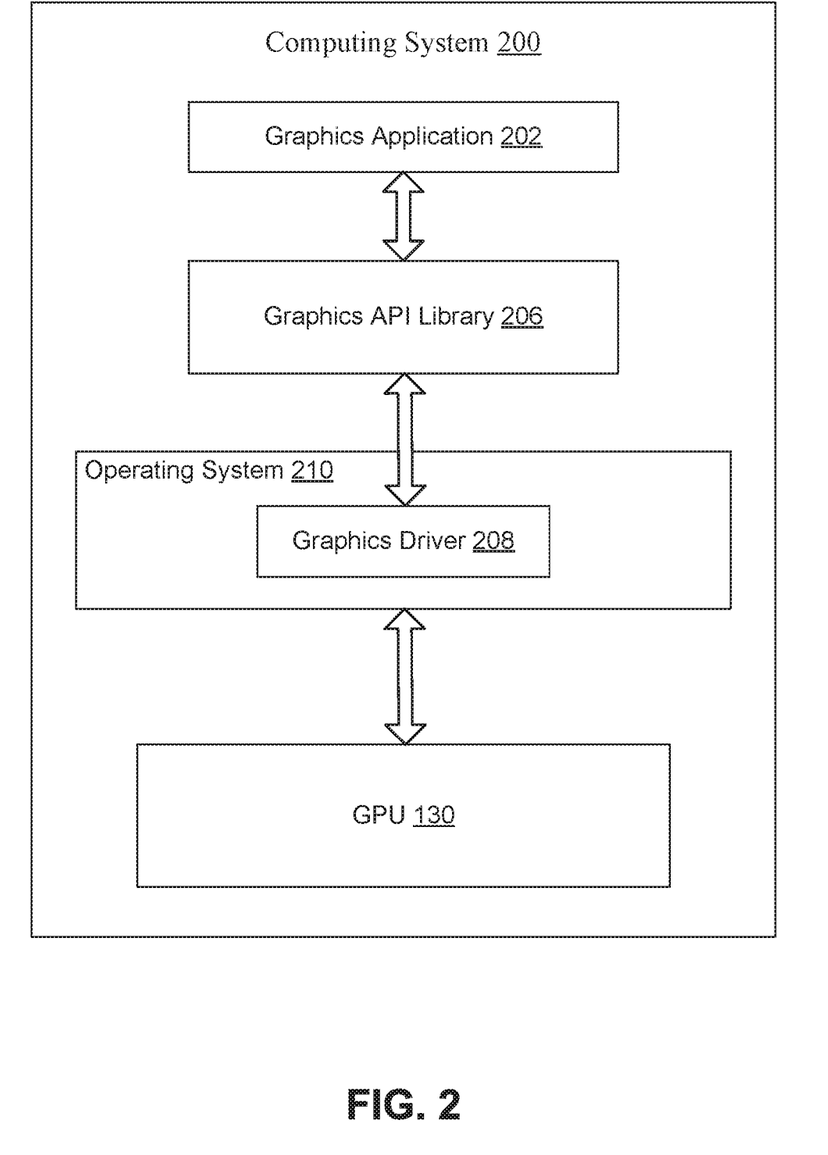
FIG. 2 is a block diagram depicting a computing system according to yet another embodiment.

FIG. 2 illustrates an example computer system and example high-level communication flow within the computer system. Computing system 200 includes graphics application 202, graphics API library 206, operating system 210, and GPU 130.

In one embodiment, graphics application 202 may be a video game, a computer-assisted design (CAD) application, a visualization application, or the like. Graphics application 202 may be configured to generate 3D graphics for presentation on a display device with the help of GPU 130.

Graphics application 202 is configured to interact with graphics API library 206, which exposes a set of high-level functions that graphics application 202 can invoke to control and/or configure the graphics pipeline of GPU 130. The functions may include functions for providing graphics resource data (e.g., vertices, textures, etc.) to the GPU pipeline, functions for configuring various rendering options/parameters, and functions for providing shaders to the programmable stages of the GPU pipeline. Examples of well-known graphics APIs include Direct3D, OpenGL, and Metal.

Graphics API library 206 communicates with graphics driver 208 when graphics API library 206 is invoked. Graphics driver 208 is configured to translate the API (i.e., function) calls issued by graphics application 202 into corresponding instructions that can be understood and executed by physical GPU 130. Graphics driver 208 is configured to act as a bridge between the high-level functions exposed by graphics API library 206 and the machine level code needed to execute those functions on the specific hardware architecture of GPU 130.

Figure 3:
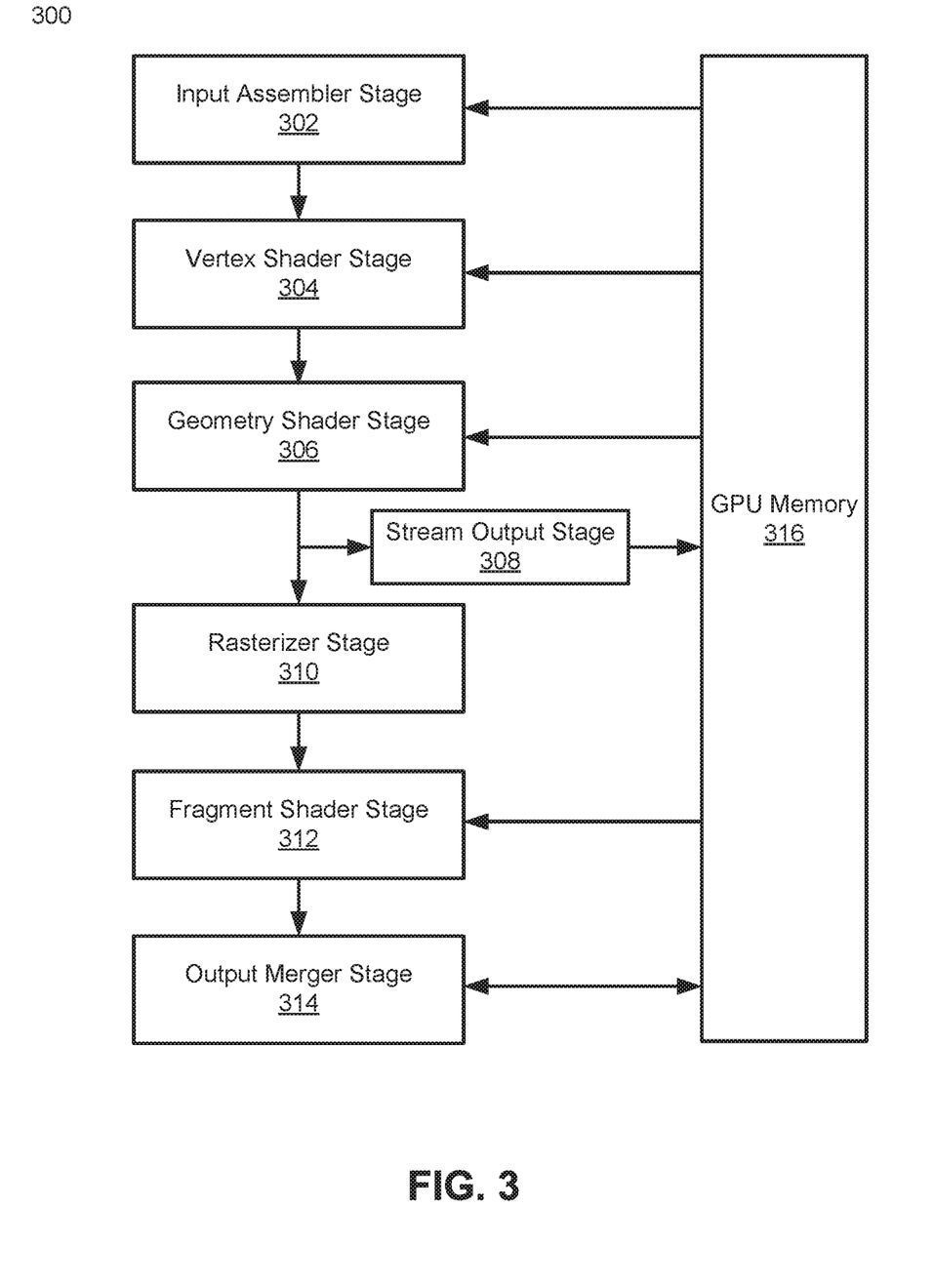
FIG. 3 is a block diagram of an example graphics pipeline according to yet another embodiment.

FIG. 3 illustrates an example graphics pipeline 300 including input assembler stage 302, vertex shader stage 304, geometry shader stage 306 (or geometry shader), stream output stage 308, rasterizer stage 310, fragment shader stage 312, output merger stage 314 and GPU memory 316. GPU memory 316 may include one or more memory resources (i.e., buffers). Further, stages 302-312 are configured to interact with GPU memory 316.

Input assembler stage 302 is configured to provide input data, such as triangles, lines, and points to the rest of the graphics pipeline 300. Vertex shader stage 304 executes application-defined vertex shaders for performing per-vertex computations (e.g., transformations, lighting, etc.). Each vertex shader may be configured to receive a single vertex and output a single vertex. Geometry shader stage 306 executes application-defined geometry shaders for performing per-primitive computations. Each geometry shader stage 306 may receive a single, fully-formed primitive (e.g., three vertices for a triangle two vertices for a line, one vertex for a point) and either discards the primitive or outputs one or more new primitives.

In one embodiment, steam output stage 308 streams primitive data from geometry shader stage 306 or vertex shader stage 304 to one or more output buffers in GPU memory 316. The data is streamed out in this manner can be accessed by the graphics application and/or recirculated back into graphics pipeline 300 as input data. Rasterizer stage 310 converts scene data, which comprises vector information (e.g., primitives), into a raster image comprising pixels. In one embodiment, rasterizer stage 310 invokes fragment shader stage 312. Output merger stage 314 combines the output of the rasterizer stage 310 and/or the fragment shader stage 312 with the existing contents of a given render target for framebuffer to generate a final pipeline result (e.g., a completed frame).

In one embodiment, one or more additional stages may be included within the stages illustrated in FIG. 3. For example, one or more of a hull shader stage, a tessellator stage, and domain shader stage may be included between the vertex shader stage and the geometry shader stage. The hull shader stage may be configured to break up a single surface of a model into many triangles. Further, the hull shader stage may be configured to produce a geometry primitives (and patch constants) that correspond to each input primitive. The tessellator stage may be a fixed-funtion pipeline stage that is configured to create a sampling pattern of the domain that represents the geometry primitive and generate a set of smaller objects (triangles, points, and/or lines) that connect the samples. The domain shader stage may be configured to output the vertex position of a subdivided point in the output primitive, based on input from the hull shader and/or tessellator stage.

The graphics pipeline 300 is an example of a graphics pipeline that supports high-level graphics APIs such as Direct3D and OpenGL. In other embodiments, the graphics pipeline 300 may be configured to support other high-level graphics APIs. Further, in one or more embodiments, one or more of the stages may be removed or one or more additional stages may be added to graphics pipeline 300.

Figure 4A:
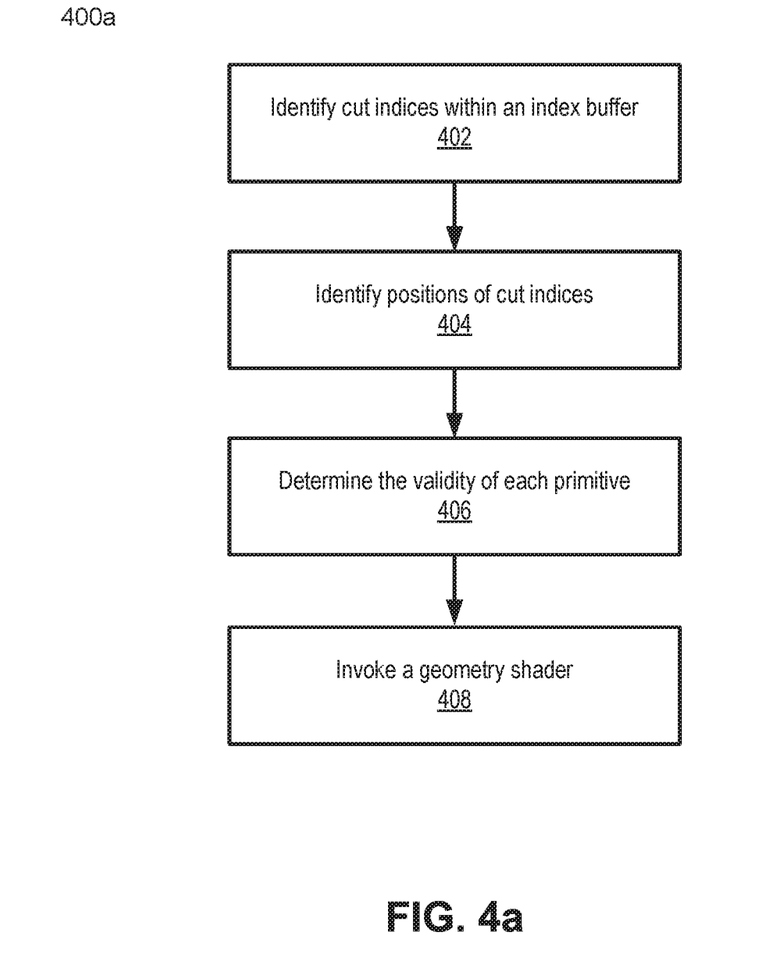
FIGS. 4a and 4b depict methods for assembling primitives according to one or more embodiments.

FIG. 4a illustrates a method 400a for a parallel compute based approach to assemble primitives/indices. At step 402 of method 400a, cut indices are identified within an index buffer. In one embodiment, the vertices and the order of the vertices are separated into two different data structures. A first data structure is the index buffer that defines the order of vertices and a second data structure that defines the vertices. The cut indices are special values that identify where a primitive starts and/or stops. In one embodiment, cut indices indicating where a primitive starts or stops are identified and mapped within the cut index buffer maps.

At step 404, positions of cut indices are identified. In one embodiment, the closest previous position that a cut index exists is identified for each index. At step 406, the validity of each primitive is determined. In one embodiment, the validity of each primitive is determined based on based on the index buffer, the cut indices and the positions cut indices. For each possible primitive, locations of the cut indexes are used to determine the validity. If a primitive is determined to start or end with a cut index, the primitive may be determined to be invalid. If the primitive is determined to start with a non-cut index, it is further reviewed to determine if it is valid. In an embodiment, one or more of the primitives are processed in parallel to determine their validity. In another embodiment, each of the primitives is processed in parallel to determine their validity. The number of primitives that are able to be processed in parallel may depend on the number of parallel processing paths available.

Figure 4B:
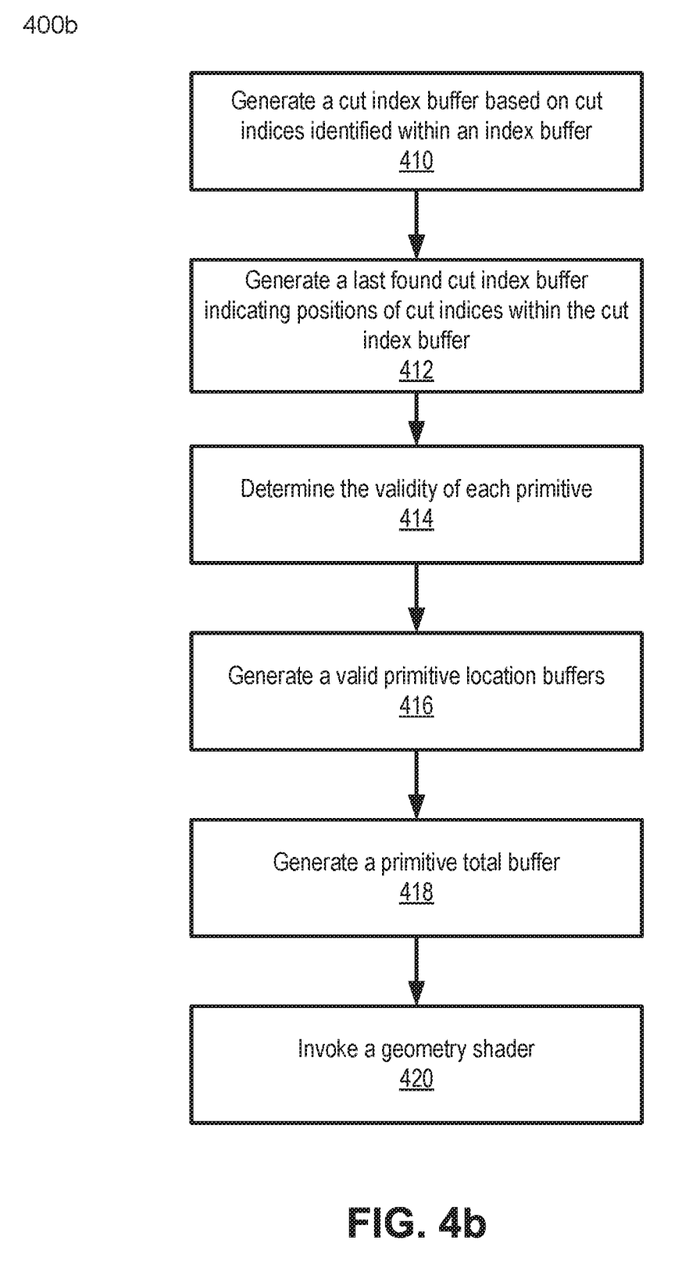

As described with regard to method 400b, one or more of the above steps of method 400a may further comprise storing their output within a buffer. In one embodiment, one or more of the above steps may be computed on demand where it is not stored within a buffer.

A geometry shader is invoked at step 408 with the index buffer, the cut indices, and valid primitives. For example, a geometry shader (i.e., geometry shader stage 306) may be configured to output one or more primitives based on the index buffer, the cut indices, and valid primitives. In one embodiment, stream output stage 308 streams primitive data from geometry shader stage 306 to one or more output buffers in GPU memory 316. Further, the number of primitives may be used to invoke a sequence of algorithms within the graphic pipeline (i.e., graphic pipeline 300).

FIG. 4b illustrates another method 400b for a parallel compute based approach to assemble primitives/indices. The steps within method 400b may be executed by a virtual machine, a host operating system, or by a GPU. In one embodiment, the approach of method 400b allows for geometry shader emulation to be processed in real time. Further, the approach of method 400b allows for geometry emulation to be processed without requiring dedicated hardware. In other embodiments, method 400 may be carried out within dedicated GPU hardware.

At step 418 of method 400, a cut index buffer is generated based on cut indices identified within an index buffer. In one embodiment, the vertices and the order of the vertices are separated into two different data structure. A first data structure is the index buffer that defines the order of vertices and a second data structure that defines the vertices. The cut indices are special values that identify where a primitive starts and/or stops. In one embodiment, cut indices indicating where a primitive starts or stops are identified and mapped within the cut index buffer maps.

For example, an index buffer may include indices [−1, 6, 7, 8, 9, −1] for set of triangle primitives. For such an index buffer, the corresponding index locations are 0, 1, 2, 3, 4, 5. While the example index buffer comprises six indices, in other embodiments the number of indices may include hundreds of thousands of indices. Further, the system and method described herein may be applied to an index buffer having any number of indices. In the above example, "−1" is the cut index and the cut index buffer identifies the location of each "−1" within the index buffer to generate a cut index buffer of [1, 0, 0, 0, 0, 6]. As can been seen in the index buffer, a cut index of −1 is found at location 0 and 5 of the index buffer, however, as a 0 may be a flag value, the cut index is incremented by 1.

In one embodiment, the cut index is incremented by 1 as the corresponding buffer stores the locations of the first cut index of the range of primitives. In other embodiments, the location of the cut indices may be stored in the buffer; each location may be incremented by 1 when the buffer is read. In such an embodiment, −1 may be stored within the index buffer for the case where the first index of the index buffer is not a cut index.

At step 404, a last found cut index buffer is generated. The last found cut index buffer indicates positions of cut indices within the cut index buffer. For example, each of the indices of the last found cut index buffer identify the closest previous position that a cut index exists within the cut index buffer. In one embodiment, generating the last found cut index buffer comprises identifying, for each index in the last found cut index buffer, a corresponding position of a preceding cut index in the cut index buffer. The cut index buffer may be processed in parallel using a parallel scan algorithm to identify the location of a previous cut index for each position within the index. The parallel scan algorithm may be one of a prefix or postfix scan algorithm.

With further reference to the above example, for an index buffer of [−1, 6, 7, 8, 9, −1] and a cut index buffer of [1, 0, 0, 0, 0, 6], the last found cut index buffer is [1, 1, 1, 1, 1, 6]. As stated above, the last found cut index buffer identifies the location for each index of the closest preceding cut index. As identified by cut index buffer, there is a cut index at index locations 0 and 5. For index locations 1-4, the last found cut index is 0 (indicated as 1, or 0+1) and for index location 5, the last found cut index is 5 (indicated as 6, or 5+1). The indices may be scanned in parallel to determine the last found cut index so that one more index are processed in parallel.

At step 414, the validity of each primitive is determined based on the index buffer, the cut index buffer and the last found cut index buffer. For each possible primitive, locations of the cut indexes are used to determine the validity. If a primitive is determined to start or end with a cut index, the primitive may be determined to invalid. If the primitive is determined to start with a non-cut index, it is further reviewed to determine if it is valid. In an embodiment, one or more of the primitives are processed in parallel to determine their validity. In another embodiment, each of the primitives is processed in parallel to determine their validity. The number of primitives that are able to be processed in parallel may depend on the number of parallel processing paths available. A valid primitive location buffer is generated at step 416, identifying the positions of valid primitives.

Figure 5:
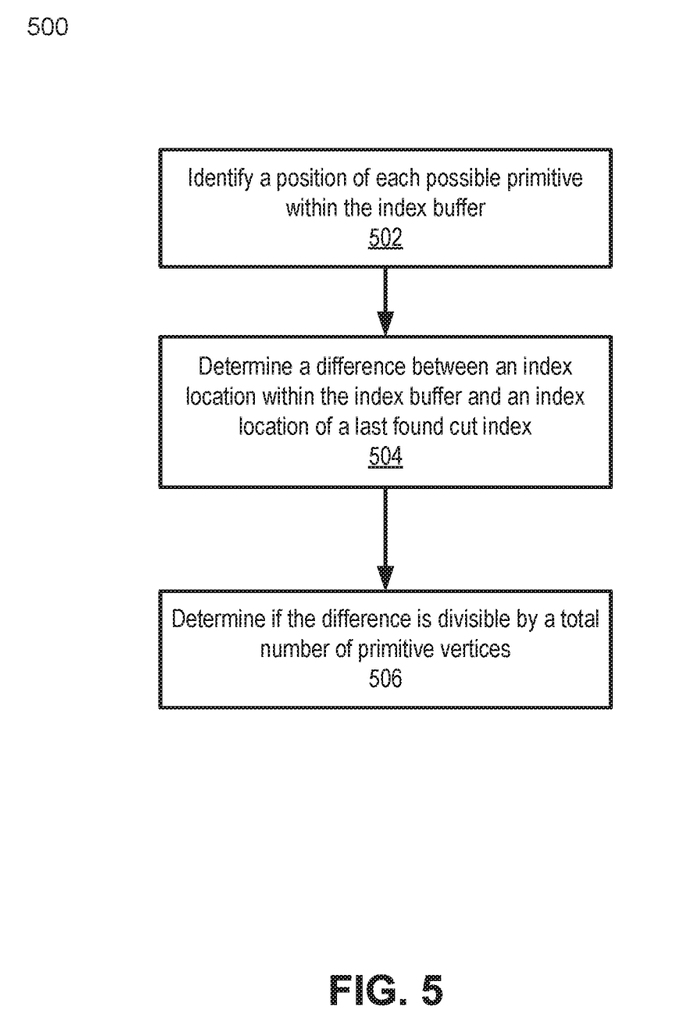
FIG. 5 depicts a method for determining valid primitives according to yet another embodiment.

With reference to the method of FIG. 5, to determine the validity of each possible primitive, at step 502, a position of each possible primitive is identified within the index buffer. As the example index buffer above corresponds to triangle primitive types, four possible primitives are identified at positions [−1, 6, 7], [6, 7, 8], [7, 8, 9], [8, 9, −1]. In other embodiment, one or more embodiments, the primitive type may include points, lines, lines with adjacency, triangles and triangles with adjacency. In various embodiments, primitive types having more than three vertices may be used.

At step 504, the validity of a primitive is determined based on a difference between an index location within the index buffer and an index location of a last found cut index buffer. For example for primitive [6, 7, 8] in the above example index, the first location and last locations are determined to not include a cut index and the location of a last found cut index is 1. The difference between last found cut index and the first location of the primitive is determined (1−1=0).

Further, at step 506, a difference between the values in the index buffer and the last found cut index buffer is determined to be divisible or not divisible by a total number of primitive vertices. With further reference to the above example, the primitive type has 3 vertices, and as 0 is divisible by 3, the second possible primitive is found to be valid.

Turning now to the first primitive is [−1, 6, 7] in the above example index buffer, as location 1 includes a cut index, the first primitive is deemed to be invalid. For the third primitive, [7, 8, 9], the first location and last location is determined to not include a cut index and the value of the last found cut index is 1. The difference between the last found cut index and the first location of the primitive is determined to be 1 (2−1=1). The difference is then examined to determine if it is divisible by the total number of primitive vertices, and in this case as it is not divisible by 3 (e.g., 1 is not divisible by 3). Hence, the primitive is determined to be invalid. For the fourth primitive, [8, 9, −1], the first location is determined to not include a cut index and the value of the last found cut index is 1. However, as the last location is determined to include a cut index, the fourth primitive may be a valid primitive. However, the fourth primitive is not initially determine be valid. The valid primitive buffer is then created with values [0, 1, 0, 0]. In one or more embodiments, any primitive that has one cut index is considered to be invalid. In one embodiment, at least two of the possible primitives may be examined to determine validity in parallel.

At step 418 a primitive total buffer is generated to reflect the total of all identified valid primitives. In one embodiment, a parallel scan algorithm may be implemented to create the primitive total buffer. The parallel scan algorithm may be one of a prefix or postfix scan algorithm. Based on the above example, the total all seen primitives may be represented by primitive total buffer [0, 0, 1, 1]. In one embodiment, the primitive total buffer is the cumulative sum of the valid primitive buffer, comprehending all previous elements. For example, "valid primitive buffer"[i]=sum "primitive total buffer"[j], for j=0 . . . i−1.

A geometry shader is invoked as step 420 with the index buffer, the cut index buffer, the valid primitive location buffer and the total number of primitives. For example, a geometry shader (i.e., geometry shader stage 306) may be configured to output one or more primitives based on the index buffer, the cut index buffer, and the valid primitive location buffer. In one embodiment, stream output stage 308 streams primitive data from geometry shader stage 306 to one or more output buffers in GPU memory 316. Further, the number of primitives may be used to invoke a sequence of algorithms within the graphic pipeline (i.e., graphic pipeline 300).

In one embodiment, an index assembler is invoked with the cut index buffer and the primitive to determine if a primitive exists at a position within a valid primitive location buffer. The index assembler checks the valid primitive buffer to determine at which locations a primitive exists. For each location determined to have an existing, the index assembler identifies the corresponding vertices, orders them in the correct winding order, and writes the output buffer at the corresponding location within the primitive total buffer. In one embodiment, the index assembler is configured to preserve the original order of the vertices. For example, if the original primitive was described with clockwise vertices, then the output primitive should remain clockwise. Further, in various embodiments, the index assembler is configured to preserve the ordering of the vertices as to not inadvertently transform a clockwise triangle into a counter-clockwise triangle and to not inadvertently transform a counterclockwise triangle into a clockwise triangle.

While method 400b describes various steps that generate various buffers, in one or more embodiments, at least one of the steps of method 400b may omit generating a buffer. In such embodiment, a step of 400b is computed as requested (e.g., on demand).

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for parallel assembly of primitives within a graphics pipeline, the method comprising:
    identifying cut indices within an index buffer by generating a cut index buffer;
    identifying positions of cut indices by generating a last found cut index buffer indicating the positions of cut indices within the cut index buffer;
    determining validity of each of a plurality of primitives based on the index buffer, the cut indices indicated by the cut index buffer and the positions of cut indices indicated by the last found cut index buffer, wherein the validity of at least two primitives of the plurality of primitives is determined in parallel; and
    invoking a geometry shader of a graphics pipeline with the index buffer, the cut indices, and valid primitives to render one or more 3D graphics.

2. The method of claim 1, wherein:
the method further comprises generating a valid primitive location buffer based on the validity determination for each of the plurality of possible primitives; and
invoking the geometry shader of a graphics pipeline comprises invoking the geometry shader of the graphics pipeline with the index buffer, cut index buffer, primitive location buffer, and the primitive total buffer to render one or more 3D graphics.

3. The method of claim 2, wherein generating the cut index buffer comprises identifying one or more values identifying where a primitive ends within the index buffer.

4. The method of claim 2, wherein generating the last found cut index buffer comprises identifying, for each index in the last found cut index buffer, a corresponding position of a preceding cut index in the cut index buffer.

5. The method of claim 4, wherein generating the last found cut index buffer further comprises invoking a parallel prefix scan algorithm.

6. The method of claim 2, wherein determining the validity of each of a plurality of primitives based on the index buffer comprises:
identifying each possible primitive within the index buffer;
determining a difference between a first index location within the index buffer for each of the possible primitives and an index location of a last found cut index within the last found cut index buffer for each of the possible primitives; and
determining if the difference is divisible by a total number of primitive vertices.

7. The method of claim 2, further comprising determining the existence of a primitive at a position within a valid primitive location based on the index buffer, the cut index buffer and the primitive total buffer.

8. A non-transitory computer-readable storage medium containing instructions for controlling a computer processor to:
identify cut indices within an index buffer by generating a cut index buffer;
identify positions of cut indices by generating a last found cut index buffer indicating the positions of cut indices within the cut index buffer;
determine validity of each of a plurality of primitives based on the index buffer, the cut indices indicated by the cut index buffer and the positions of cut indices indicated by the last found cut index buffer, wherein the validity of at least two primitives of the plurality of primitives is determined in parallel; and
invoke a geometry shader of a graphics pipeline with the index buffer, the cut indices, and valid primitives to render one or more 3D graphics.

9. The storage medium of claim 8, wherein:
the non-transitory computer-readable storage medium containing instructions for controlling the computer processor to further generates a valid primitive location buffer based on the validity determination for each of the plurality of possible primitives; and
invoking the geometry shader of a graphics pipeline comprises invoking the geometry shader of the graphics pipeline with the index buffer, cut index buffer, primitive location buffer, and the primitive total buffer to render one or more 3D graphics.

10. The storage medium of claim 9, wherein generating the cut index buffer comprises identifying one or more special values identifying where a primitive ends within the index buffer.

11. The storage medium of claim 9, wherein generating the last found cut index buffer comprises identifying, for each index in the last found cut index buffer, a corresponding position of a preceding cut index in the cut index buffer.

12. The storage medium of claim 9, wherein generating the last found cut index buffer further comprises invoking a parallel prefix scan algorithm.

13. The storage medium of claim 9, wherein determining the validity of each of a plurality of primitives for the at least two possible primitives in parallel based on the index buffer comprises:
identifying each possible primitive within the index buffer;
determining a difference between a first index location within the index buffer for each of the possible primitives and an index location of a last found cut index within the last found cut index buffer for each of the possible primitives; and
determining if the difference is divisible by a total number of primitive vertices.

14. The storage medium of claim 9, further comprising invoking an index assembler with the cut index buffer and the primitive total buffer to determine the existence of a primitive at a position within a primitive presence buffer.

15. A computer system comprising:
a graphics processing unit comprising instructions and configured to:
identify cut indices within an index buffer by generating a cut index buffer;
identify positions of cut indices by generating a last found cut index buffer indicating the positions of cut indices within the cut index buffer;
determine validity of each of a plurality of primitives based on the index buffer, the cut indices indicated by the cut index buffer and the positions of cut indices indicated by the last found cut index buffer, wherein the validity of at least two primitives of the plurality of primitives are determined in parallel; and
invoke a geometry shader of a graphics pipeline with the index buffer, the cut indices, and valid primitives to render one or more 3D graphics.

16. The computer system of claim 15, wherein:
the graphics processing unit comprising instructions is further configured to generate a valid primitive location buffer based on the validity determination for each of the plurality of possible primitives; and
invoking the geometry shader of a graphics pipeline comprises invoking the geometry shader of the graphics pipeline with the index buffer, cut index buffer, primitive location buffer, and the primitive total buffer to render one or more 3D graphics.

17. The computer system of claim 16, wherein generating the cut index buffer comprises identifying one or more special values identifying where a primitive ends within the index buffer.

18. The computer system of claim 16, wherein generating the last found cut index buffer comprises invoking a parallel prefix scan algorithm to identify, for each index in the last found cut index buffer, a corresponding position of a preceding cut index in the cut index buffer.

19. The computer system of claim 16, wherein determining the validity of each of a plurality of primitives for the at least two possible primitives in parallel based on the index buffer comprises:
identifying each possible primitive within the index buffer;

determining a difference between a first index location within the index buffer for each of the possible primitives and an index location of a last found cut index within the last found cut index buffer for each of the possible primitives; and determining if the difference is divisible by a total number of primitive vertices.

20. The computer system of claim 15, a graphics processing unit is a virtualized graphics processing unit within a virtual machine.

\* \* \* \* \*